United States Patent [19]

Howeth

[11] Patent Number: 4,740,221
[45] Date of Patent: Apr. 26, 1988

[54] AIR FILTER APPARATUS WITH MODULARIZED SELF-CLEANING FILTER SYSTEM

[76] Inventor: D. Franklin Howeth, 233 Chuck Wagon Trail, Fort Worth, Tex. 76108

[21] Appl. No.: 936,823

[22] Filed: Dec. 2, 1986

[51] Int. Cl.$^4$ ............................................. B01D 46/04
[52] U.S. Cl. ...................................... 55/302; 55/493; 55/502; 55/508; 55/510; 55/513
[58] Field of Search .................. 55/293, 294, 312, 493, 55/502, 508, 510, 513

[56] References Cited

U.S. PATENT DOCUMENTS

| | | | |
|---|---|---|---|
| 3,360,910 | 1/1968 | Soltis | 55/502 X |
| 3,513,638 | 5/1970 | Young | 55/302 X |
| 3,803,807 | 4/1974 | Mills | 55/293 X |
| 3,951,627 | 4/1976 | Barr et al. | 55/292 X |
| 4,218,227 | 8/1980 | Frey | 55/302 |
| 4,218,277 | 8/1980 | Van Der Burg | 156/96 |
| 4,233,041 | 11/1980 | Noland | 55/294 X |
| 4,544,389 | 10/1985 | Howeth | 55/302 |

Primary Examiner—Charles Hart
Attorney, Agent, or Firm—Hubbard, Thurman, Turner & Tucker

[57] ABSTRACT

Disclosed is an air filter apparatus having a separator chamber formed by a housing in which a barrier type filter element is mounted to an annular backflushing air reservoir or manifold having a bore therethrough on a unitary support member which may be removed from the housing through the manifold bore. Reverse flow filter element flushing air discharge heads are mounted to the manifold and disposed over the filter element clean air discharge chambers and are movable away from the manifold bore so that the filter element may be inserted into and removed from the separator chamber. The filter element support member is secured to the manifold by pins which support a flange for movement relative to the housing to relieve pressure differentials across the filter element to prevent rupture of the element or minimize the hazard of failures elsewhere in the filter system.

46 Claims, 6 Drawing Sheets

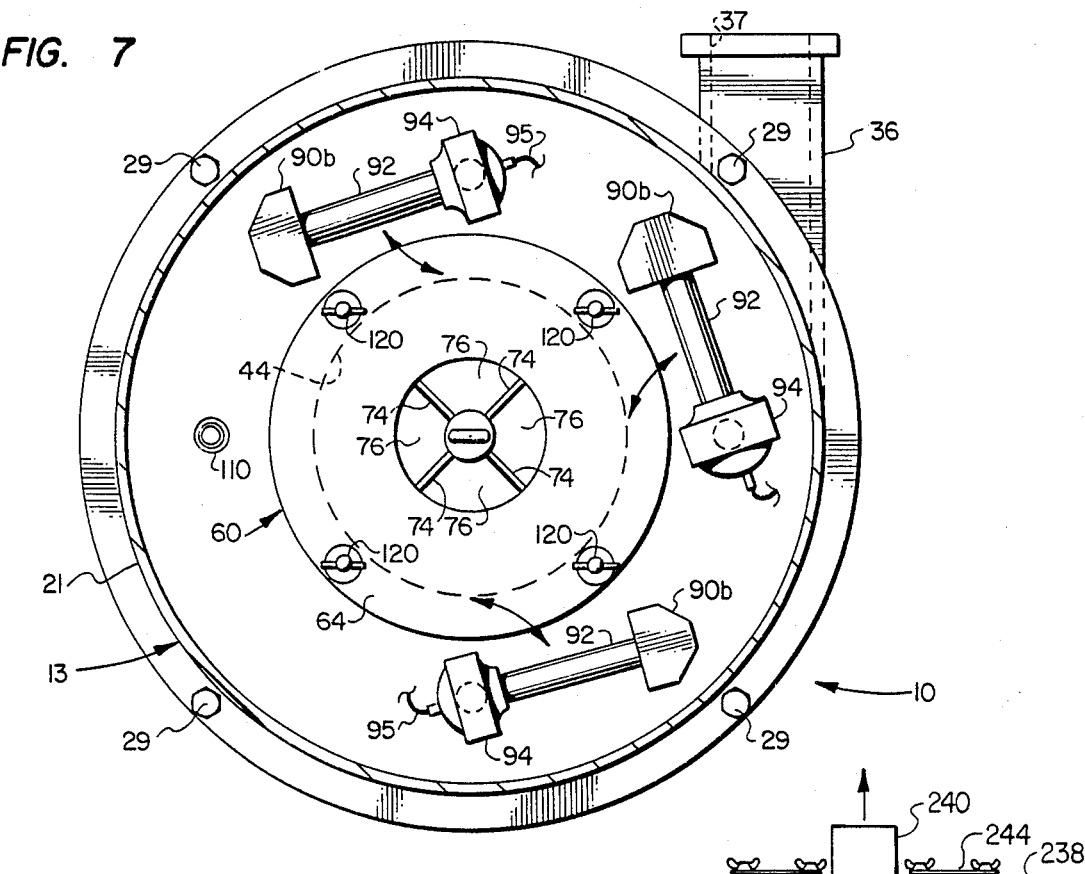
FIG. 7
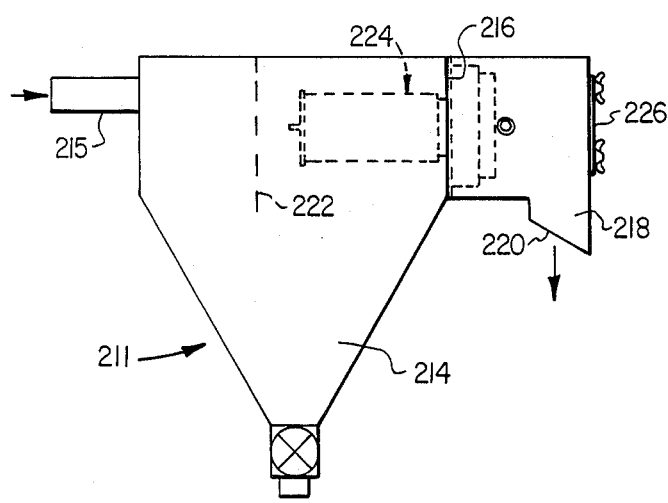
FIG. 8
FIG. 9

AIR FILTER APPARATUS WITH MODULARIZED SELF-CLEANING FILTER SYSTEM

BACKGROUND OF THE INVENTION

1. Field of the Invention

The present invention pertains to an air filter unit having a housing which is constructed to provide for insertion of and removal of a barrier or impingement air filter element from a top side of the housing and including a plurality of reverse flow air cleaning nozzles which are mounted on a manifold surrounding an opening in the housing through which the filter element may be inserted and removed without removal of the manifold or nozzle structure.

2. Description of the Prior Art

The continued emphasis on reducing atmospheric pollution caused by air-borne particulate material has placed further demands on the development of suitable impingement or barrier type air filter apparatus by way of reducing the physical size of the apparatus while maintaining a suitable material separation or cleaning function and without unduly stressing or shortening the life of the filter element structure.

In an effort to reduce the overall physical size of air filter apparatus for relatively large scale industrial applications of various types the multiple, cloth bag type filter units have, to some extent, been obsoleted by the development of filter units utilizing so-called pleated paper barrier or impingement type filters. This type of filter element has been used in relatively light duty applications such as filtering combustion air in internal combustion engines of various types where physical size of the filter is of some concern but particulate material loadings on the filter element are usually relatively light.

The adaptation of pleated paper or similar types of porous media filter elements to industrial type filter apparatus has been accomplished in one sense by the so-called derating of the filter element so that it can accommodate relatively high material loading rates and be adequately cleaned as well as withstand repeated reverse air jet type cleaning processes. Such an approach to the improvement of air filter apparatus is described in U.S. Pat. No. 4,218,227 to Robert E. Frey. One reason for the development of the derated pleated paper filter is to minimize pressure losses of the air flowing across the filter element so that the pleated paper filter is competitive with the so called cloth bag type filters.

Prior to the development of the invention in U.S. Pat. No. 4,544,389, the arrangement of mounting cylindrical pleated paper and similar barrier type filter elements within a filter housing was necessarily complicated by the structure of the air pressure pulse or shock wave type reverse air jet cleaning devices. This prior art type structure required that the filter element be removed from the sidewall or bottom wall of the filter housing and which thereby required entry into the filter housing from the so called "dirty" side of the filter unit. This type of arrangement is unattractive for several reasons including the disadvantage that service personnel are unavoidably contaminated with the particulate material being removed from the filter during servicing and handling of the filter element, the handling of the filter element is difficult, insertion of and removal of the filter element with respect to the housing is a cumbersome and difficult process and the physical size and construction of the filter housing is complicated. It is desirable in most filter applications that the filter element be removable from the top of its housing which advantageously can provide for access to the "clean" air side of the housing. This simplifies filter unit construction and does not require that service personnel become unduly contaminated by the material being separated from the air flow stream being filtered.

SUMMARY OF THE INVENTION

The present invention provides an improved air filter apparatus including a barrier or porous media impingement type filter system that is adaptable to a variety of particulate preseparator housings. In accordance with one aspect of the invention a cylindrical barrier type filter element, particularly a pleated paper type element, is supported in a filter housing and is removable from a top wall of the housing without requiring the movement of a large portion of the filter structure and without requiring that service personnel be exposed to substantial contamination by the particulate material separated from the air flowing through the filter unit. The present invention also provides an air filter apparatus having a filter element which may be thoroughly cleaned by a reverse flow of flushing air without adversely stressing the filter element and without requiring that the filter element be substantially derated as regards its air flow capacity.

In accordance with another aspect of the present invention there is provided a filter apparatus having a mounting structure for a barrier type filter element which may be inserted through a top wall of a filter housing and which may be secured in the filter housing in such a way that only a single seal surface is required to be closed between the dirty or contaminated air side of the housing and the clean air or outlet side of the housing. Moreover, the filter housing and the structure for providing reverse flow filter element cleaning air are uniquely adapted to provide easy access to the filter element.

In accordance with another aspect of the present invention an air filter apparatus is provided having reverse flow filter element cleaning or flushing air structure including a flushing air manifold which is of sufficient air storage capacity to provide for relatively large flow volumes of reverse flow flushing air and wherein a plurality of reverse flow flushing air nozzle heads are mounted in such a way that they may be easily moved aside to permit insertion of and removal of the barrier type filter element and its support structure. The filter element is conveniently mounted on a generally cylindrical support member which is provided with a tubular conduit for conducting clean air from the filter element during its normal operation and for conducting relatively large volumes of reverse flow flushing air to remove particulate material from the filter element without generating the severe shock or vibratory type forces associated with conventional reverse flow air jet cleaning systems.

In yet a further aspect of the invention, there is provided a structurally and functionally independent modularized self-cleaning filter system that is adapted for use with a variety of particulate pre-separators. The module of the present invention combines the features of filtration and filter cleaning into an integrated unit that may be fitted into known cabinetry to provide an improved system.

Still further advantages and features of the present invention include the provision of a filter element which may be passed through a relatively large bore formed in the filter housing, which bore is formed by a wall of a backflushing air manifold and which bore also provides for insertion of and removal of the barrier type filter element with respect to the filter chamber. For both so-called positive and negative pressure type applications the filter element support member is secured to the filter housing by a unique retaining structure which permits movement of the support member and the filter element to relieve any excessive pressure differentials between the separation chamber and the clean air flow chamber of the filter unit to minimize the chance of structural damage to the filter apparatus or the filter element. In that regard, the present invention may include filter pressure support members which prevent collapse of the filter element due to pressure differential across the filter medium.

Although certain features and advantage of the present invention have been described hereinabove those skilled in the art will further appreciate these features as well as additional superior aspects of the invention upon reading the detailed description which follows.

BRIEF DESCRIPTION OF THE DRAWING

FIG. 7 is a view taken from the same line as the view of FIG. 3 and showing the backflushing air heads moved clear of the filter support member.

FIG. 8 is a side view of an impact and gravity preseparator housing showing the environment of a self-cleaning filter module of the present invention;

FIG. 9 is a side view of a gravity preseparator housing showing another environment of a self-cleaning filter module of the present invention;

DESCRIPTION OF THE PREFERRED EMBODIMENT

Figure 1:
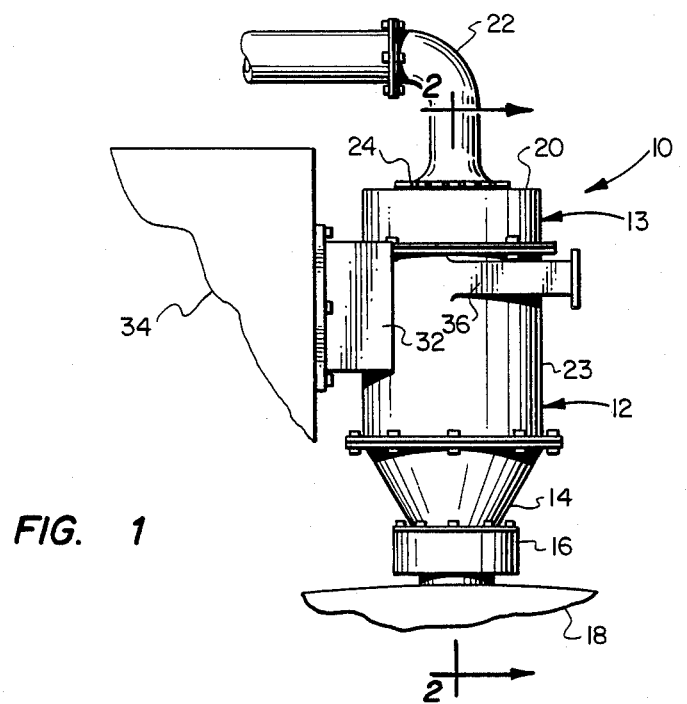
FIG. 1 is a side elevation of an air filter apparatus in accordance with the present invention.

In the description which follows like parts are marked throughout the specification and drawing with the same reference numerals, respectively. The drawing figures are not necessarily to scale and certain features of the invention may be shown exaggerated in scale or in somewhat schematic form in the interest of clarity.

Figure 2:
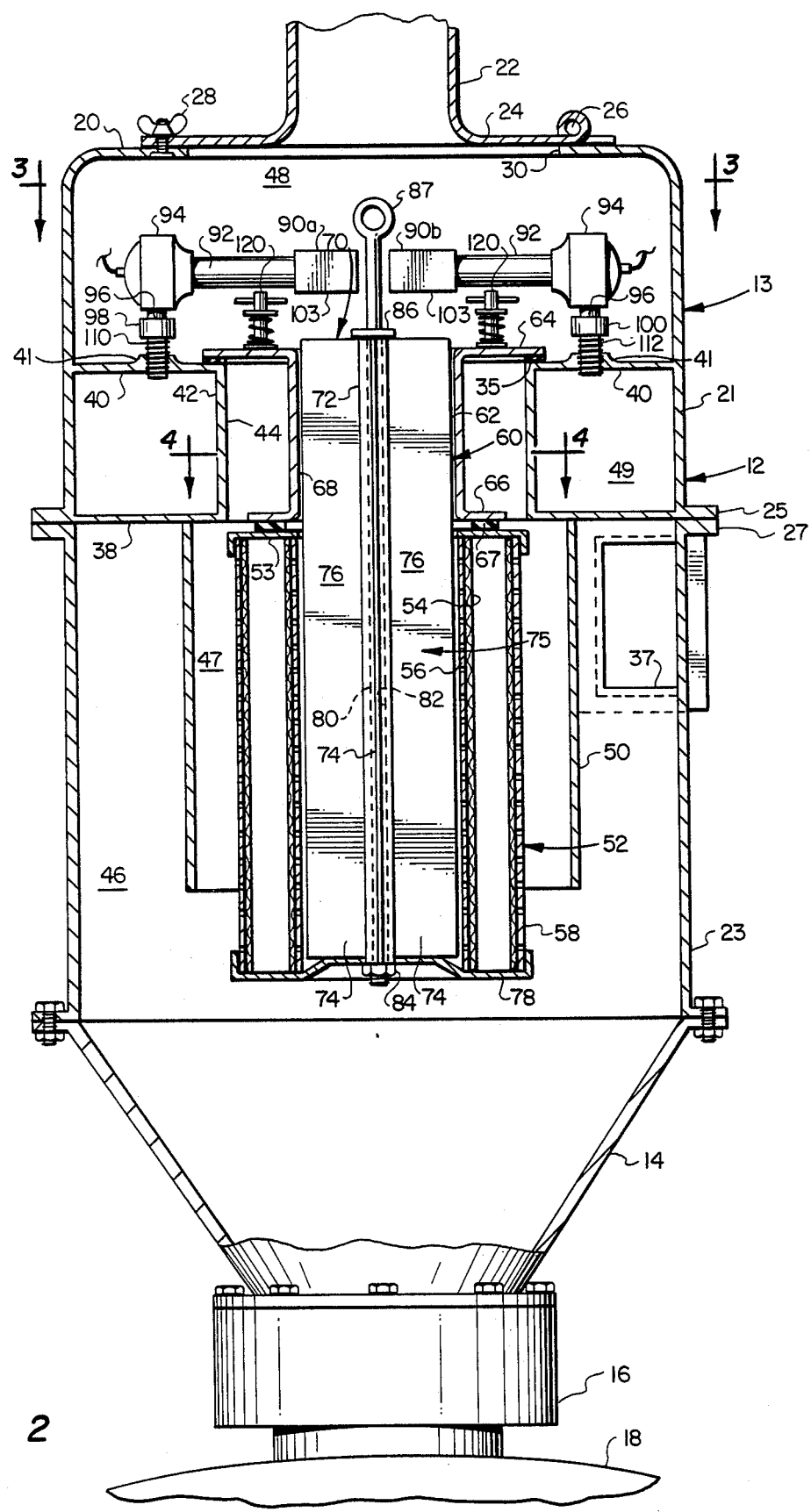
FIG. 2 is a vertical central section view of the filter apparatus taken along Line 2—2 of FIG. 1.

Referring to FIG. 1, an air filter apparatus in accordance with one embodiment of the present invention is illustrated and generally designated by the numeral 10. The filter apparatus 10 includes a cyclonic inertial preseparator, which includes a generally cylindrical housing 12 having a depending frusto-conical material discharge hopper portion 14 which is provided with a suitable air lock type discharge valve 16 for discharging particulate material collected within the housing 12 into a suitable receiving bin or other receiving means, generally designated by the numeral 18. Referring also to FIG. 2, the filter housing 12 has a generally horizontal top wall 20 on which is mounted a clean air discharge conduit 22. The conduit 22 includes a support flange 24 which is hinged to the top wall 20 at 26 and is secured in a closed position over an opening 30 in the wall 20 by one or more suitable removable fasteners 28. The particular discharge conduit 22 illustrated is exemplary as will be appreciated by those skilled in the art and may be replaced by other structure having a support flange or a similar member for disposition over the relatively large diameter opening 30.

The filter apparatus 10 may be adapted for a wide variety of air filtering applications and may, for example, be used in conjunction with collecting particulate matter entrained in a bailing air flow stream emanating from a drill hole during rock drilling or other earth drilling operations. In this respect the filter apparatus 10 may be suitably mounted by a bracket member 32, FIG. 1, on a frame 34 comprising part of a drilling rig or the like, otherwise not shown. The salient features of the filter apparatus 10, may be embodied in a variety of filter apparatus which may be structurally modified in ways not affecting the invention for various specific air filtering applications. The housing 12 is further provided with a generally rectangular shaped air inlet conduit 36 secured to the housing 12 and opening to the interior thereof in a generally tangential manner with respect to the cylindrical configuration of the housing 12 which is connected to a source, not shown, of air laden with particulate material. The filter apparatus 10 may be used in conjunction with so-called positive pressure air conveying means wherein air is forced through a passage 37 formed by the conduit 36 into the interior of housing 12 at a pressure greater than the ambient atmospheric pressure, or the filter unit 10 may be incorporated in a system wherein a suction pump or the like is disposed to be in communication with the conduit 22 downstream of the apparatus 10 with respect to air flow therethrough and thereby maintain a pressure within the housing 12 generally less than ambient atmospheric pressure.

Referring primarily to FIG. 2, the housing 12 includes an upper section 13 including the top wall 20 and a cylindrical sidewall 21 which may extend to the intersection of the cylindrical portion of the housing 12 with the hopper portion 14 and whereby the housing 12 may comprise a unitary structure characterized by the top wall 20, the cylindrical sidewall portion 21 and the conical hopper portion 14. The illustrated embodiment of the housing 12 includes a lower cylindrical section 23 secured to the upper section 13 across cooperating flanges 25 and 27 suitably secured together by fasteners 29. The top wall 20 may also be fabricated separate from the housing section 13 in order to facilitate certain machining operations for the section 13.

The housing 12 further includes an interior transverse partition or wall 38 and a second transverse partition or wall 40 which are delimited by and contiguous with a cylindrical wall portion 42 defining a bore 44 extending between a primary cyclone type material preseparator chamber 46 and a clean air discharge chamber 48 formed in the upper housing section 13. The transverse walls 38 and 40 together with the cylindrical wall 42 and the outer sidewall 21 of the housing defines an annular filter backflushing air storage manifold or chamber 49. A generally cylindrical flow deflecting shroud 50 is contiguous with the wall 38 and depends therefrom to form a secondary separation chamber 47 concentric with and within chamber 46.

Figure 4:
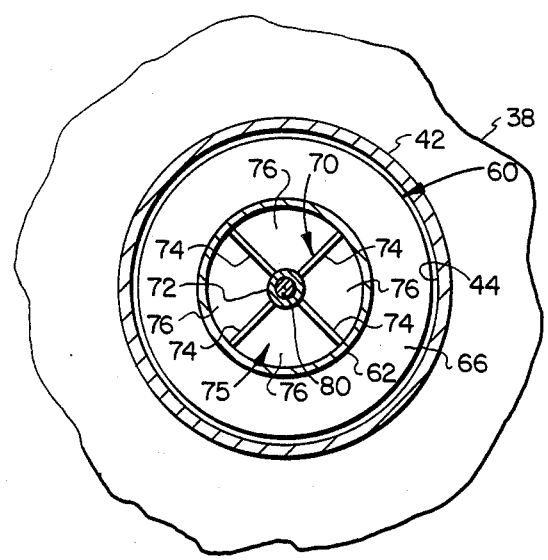
FIG. 4 is a section view taken along the line 4—4 of FIG. 2.

The filter apparatus 10 includes a barrier or impingement type filter element, generally designated by the numeral 52 and comprising an elongated cylindrical, annular pleated paper structure of a type generally well known in the art of air filter apparatus. The filter element 52 typically comprises an annular pleated paper filter media 54 and inner and outer foraminous metal or plastic cylindrical tubular support shields 56 and 58 on either side of the media 54. The overall length of the filter element 52 or its positional relationship to the shroud 50 is such that a major portion of the filter element does not extend below the lower edge of the shroud. The filter element 52 is supported in the chamber 46 on a unique support member 60 having a generally cylindrical hub portion 62 interposed between transverse flanges 64 and 66. The flange 66 is of a diameter slightly less than the diameter of the bore 44 and approximately the same diameter as the outer diameter of the filter element 52. The hub portion 62 includes an internal cylindrical bore 68 which is of about the same diameter as the bore delimited by the shield 56 and forming an air outlet flow passage 75 in which is disposed an elongated divider member 70. The divider member 70 has a tubular hub portion 72 and circumferentially spaced radially extending divider plates 74, see FIG. 4 also, which divide the clean air flow passage 75 formed by the filter element 52 and the bore 68 into a plurality of passage or chamber segments 76. The divider member 70 may be formed integral with the support member 60, as shown, or as a separate member slidably disposed in the bore 68.

The filter element 52 is maintained in assembly with the support member 60 by a bottom retainer plate 78 which may comprise an integral part of the filter element, and an elongated retaining rod 80 which extends through a bore 82 formed in the hub 72 and is threadedly engaged with a retaining nut 84. A transverse collar 86 is formed on the rod 80 and engages the upper end of the hub 72. The rod 80 may include a lifting ring portion 87 formed on the upper end thereof for lifting the assembly of the filter support member 60, the divider member 70 and the filter element 52 out of the housing 12 through the bore 44 and the opening 30 in the top wall 20 when, of course, the conduit 22 has been moved away from the opening 30.

The filter element 52 is preferably held in engagement with the support member 60 across an annular seal ring 67 interposed between the flange 66 and a transverse upper wall 53 of the filter element. Accordingly, when the filter element 52 and its support member have been removed from the housing 12, the nut 84 may be removed from the rod 80 to permit removal of the retainer 78 and the filter element 52 from the support member and a new filter element mounted on the support member and replaced within the chamber 46 in a convenient manner. Since entry to the interior of the housing 12 for removal of the filter element 52 is through the so called clean side of the apparatus 10, that is through chamber 48, persons servicing the apparatus 10 are not exposed to a substantial amount of contamination from the particulate material being separated by the apparatus 10.

Figure 3:
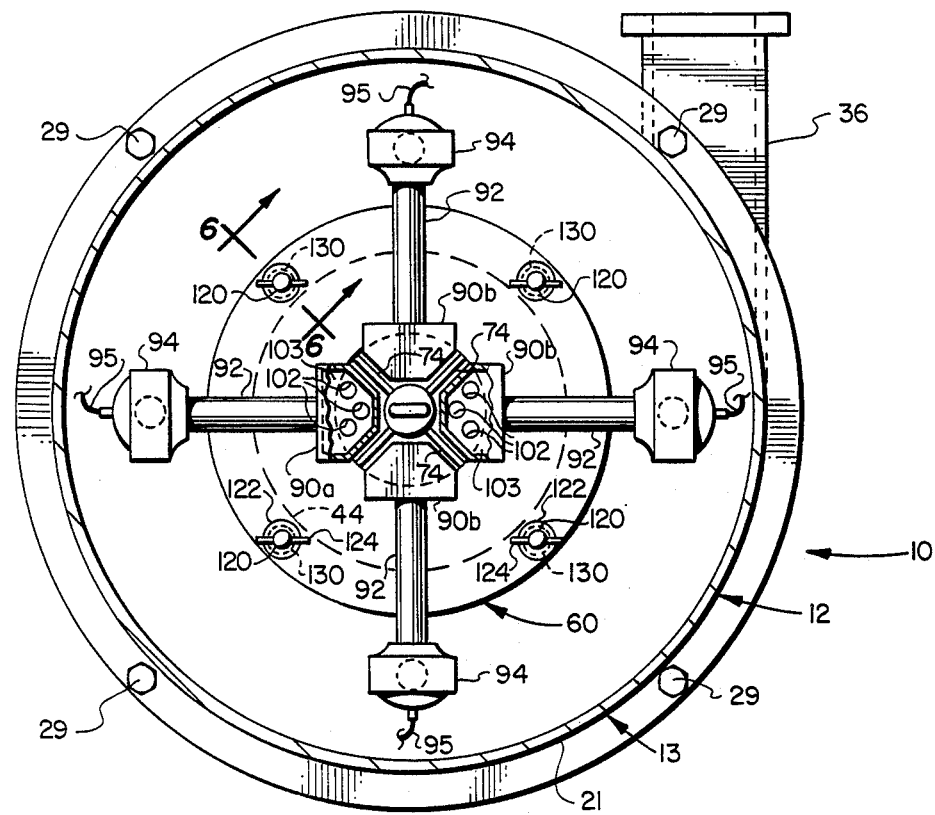
FIG. 3 is a section view taken generally along the line 3—3 of FIG. 2.

Referring to FIGS. 2 and 3, the apparatus 10 utilizes an improved arrangement of multiple reverse flow or backflushing air jetting devices which are provided by a plurality of nozzle heads 90a and 90b arranged such that they are disposed generally directly above the segmented clean air flow passages or chambers 76. Each of the heads 90a and 90b comprises a hollow manifold type member which is supported on a cantilever conduit 92 extending from a quick opening valve 94. The valves 94 are each supported on respective rigid conduit portions 96 which are connected to a quick release coupling 98, see FIG. 5, in the case of the head designated 90a, or to suitable swivel type fittings 100 in the case of the remaining backflushing heads 90b. The heads 90a and 90b are each provided with one or more jet nozzles or orifices 102, as shown for the head 90a and one of the heads 90b in FIG. 3, by way of example, formed in a bottom wall 103 of the respective heads and directed generally downwardly into the bore 68 and the respective segmented passages 76.

As described in U.S. Pat. No. 4,544,389, the heads 90a and 90b are configured such that jets of air create an induction of air to flow from chamber 48 through the bore 68 and the segmented passages or chambers 76 to thoroughly flush the filter element 52 of accumulations of particulate material on the outwardly facing surfaces of the media 54 whereby such material may fall through chamber 46 into the hopper portion 14 for suitable discharge into the receiver 18. The provision of the multiple backflushing air discharge heads or manifolds 90a and 90b provides for discharging a substantially greater volume of backflushing air through the bore 68 and the segmented chambers 76 than is provided by prior art apparatus and without unduly stressing the filter media 54. The arrangement of the manifold chamber 49 also provides for a substantial volume of backflushing air to be available at the valves 94 whereby relatively low pressures, in the range of 40 psig or less, can be maintained in the manifold chamber.

The flushing air discharge valves 94 are of a type which may be remotely controlled by the delivery of a pilot pressure fluid signal through conduits 95 from a control, not shown, which may be similar to a control circuit described in U.S. Pat. No. 4,465,497. The valves 94 are preferably sequentially opened and closed to deliver backflushing air to one chamber 76 at a time to minimize interruption of air flow from chamber 46 to chamber 48. The valves 94 may be of a type commercially available from Automatic Switch Company of Florham Park, N.J. as their model 835633. The manifold chamber 49 is in communication with a source of pressure air, not shown, for delivering backflushing air to the heads 90a and 90b.

Figure 5:
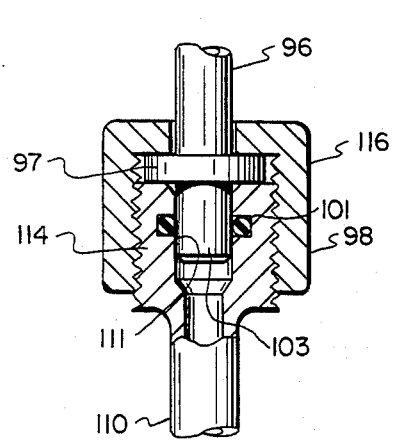
FIG. 5 is a detail section view showing the releasable connection between on of the backflushing air discharge heads and its supply manifold.

As shown in FIGS. 2 and 5, the heads 90a and 90b are supported on wall 40 at respective bosses 41 by a suitable tubular fitting 110 and tubular fittings 112, respectively. Referring particularly to FIG. 5, the fitting 110 has a threaded plug portion 114 and a coupling nut 116 retained on the conduit 96 by a collar 97 for supporting the conduit portion in a receiving bore 111 formed in the plug portion 114. A suitable o-ring seal 101 engages a spigot portion 103 of the conduit 96. Accordingly, the assembly of the head 90a, including the conduit 92, valve 94 and the conduit 96 associated with the head 90a may be removed as a unit by unthreading the nut 116 from the fitting 110. In so doing the heads 90b may be swung about their swivel connectors 100 to a position clear of the bore 44, as shown in FIG. 7, to provide for removal of the filter element 52 and its support member 60 as a unit. The swivel connectors 100 may be of a conventional type or the heads 90b may each also be mounted in the same manner as the head 90a whereby each nut 116 associated with a head 90b may merely be loosened to permit swinging the heads 90b to the position shown in FIG. 7. The heads 90a and 90b are each preferably dimensioned such that they fit closely relative to each other in the working position shown in FIG. 3 and such that they are forcibly oriented in the desired position between the dividers 74 and aligned with the chamber segments 76. Accordingly, the heads 90a and 90b are automatically arranged in a predetermined pattern and one head requires removal so that the remaining heads may be moved aside.

An expanding, generally conical jet of air of predetermined shape can be generated by each head 90a or 90b to contact the wall forming the bore 68 and adjacent divider plates 74 to form a seal and to entrain substantial amounts of ambient air to flow into the respective chambers 76 during a filter element backflushing operation. Thanks to the arrangement of the backflushing head 90a and its supporting structure it is the only head which must be removed from its support to gain access to the filter element 52 and its support member 60 for removal from housing 12. Those skilled in the art will appreciate that the heads 90a and 90b may be mounted in such a way as to pivot about generally horizontal axes to swing away from the bore 44 also, if desired.

Figure 6:
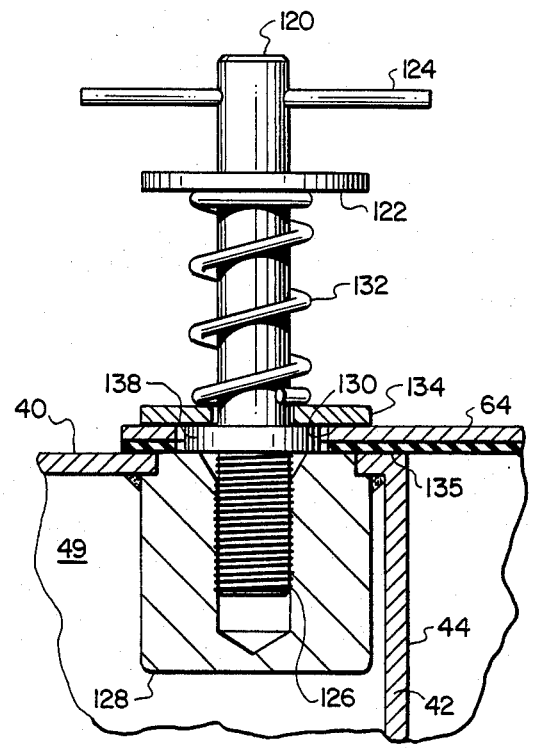
FIG. 6 is a detail section view taken along line 6—6 of FIG. 3, and showing one of the retaining members for the barrier filter support member.

Referring further to FIGS. 2, 3 and 6, the support member 60 is retained in assembly with the housing 12 by spaced apart anchor pins 120, each of which includes an integral radially extending collar 122 formed thereon adjacent to a T-shaped handle portion 124. Referring to FIG. 6, by way of example for each of the pins 120, the opposite end of the pin 120 is threaded at 126 for threaded engagement with a cooperating blind threaded hole formed in a boss 128 on the wall 40. As indicated in FIG. 6, each of the pins 120 extends through a clearance hole 130 formed in the flange 64 and aligned with the threaded hole in boss 128. A coil spring 132 is retained on pin 120 between collar 122 and a collar 134 slidable on the pin 120. The collar 134 is disposed between the spring 132 and a fixed collar portion 138 also formed on the pin 120. The sliding collar 134 is engageable with flange 64 and biases the flange against upward movement in response to a tendency for the support member 60 to move upward, viewing FIGS. 2 and 6, as a result of a differential between the pressure in the chamber 46 and the chamber 48 acting across the axially projected area of the support member 60 delimited generally by the cross-sectional area of the bore 44. The springs 132 can be selected of a predetermined force-deflection characteristic such as to bias the flange 64 toward the wall 40 compressing a resilient annular seal member 135 therebetween and wherein the support member 60 is yieldable to unseat from the seal member to relieve pressure in the chamber 46 if it should exceed a predetermined limit. If a pressure differential occurs across the axially projected area of flange 64 exposed to the bore 44 which produces a force greater than the cumulative biasing force of springs 132, the support member 60 and filter element 52 will move upward, viewing FIG. 2, to allow air in chamber 46 to escape through the bore 44 directly to chamber 48 around the flanges 66 and 64. The configuration of the pins 120 permits removal of the pins in assembly with their biasing springs 132 and flange engaging collar members 134 when it is desired to remove the filter element 52 and its support member 60 from the housing 12.

The provision of the removable and/or swing away backflushing heads 90a and 90b and the filter element support member 60 permits easy access to the filter element 52 from the clean side of the apparatus 10 for servicing the filter element 52 or changing the element when required. Accordingly, only a top plate such as the flange 24 or a fitting similar to the conduit 22, and the reverse flushing air heads 90a and 90b must be moved aside before the filter element 52 can be removed from the housing 12 which eliminates the need for movement of heavy structural components such as the section 13 of the housing 12.

The operation of the filter apparatus 10 is believed to be readily understandable from the foregoing description of the structure, and the manner of removing the filter element 52 together with its support member 60 has been explained in conjunction with the description of the structure. The provision of a single seal member 135 between the filter element support port member 60 and the housing 12 is also advantageous and reduces the possibility of unwanted leakage of unfiltered air except under conditions wherein imminent failure of the filter element 52 might occur without movement of the support member 60 to relieve a pressure differential between the chambers 46 and 48.

Referring now to FIGS. 8 and 9, there are shown alternative environments for the modularized self-cleaning filter system of the present invention. In FIG. 8, an impact and gravity particulate presparator filter unit is designated generally by the numeral 211. Unit 211 includes a housing 213 which forms a particulate preseparator chamber 214 having an inlet 215. A vertically upstanding transverse wall is positioned in housing 213 to divide particulate chamber 214 from a clean air chamber 218 having a clean air outlet 220. An impingement panel 222 is disposed within particulate chamber 214 in the path of contaminated air entering through inlet 215. Preliminary separation of particulate matter from clean air is thus accomplished by the combination of impingement upon impingement panel 222 and gravity within particulate chamber 214. Secondary separation of particulate material from clean air is accomplished by the self-cleaning filter module 224 of the present invention. It will be noted that in the embodiment of FIG. 8, module 224 is mounted horizontally, perpendicular to transverse wall 216. A coverplate 226 is mounted to housing 213 to provide access to module 224.

In FIG. 9, there is shown an alternative environment for the modularized self-cleaning filter system of the present invention. A gravity preseparator unit is designated generally by the numeral 228. Preseparator unit 228 includes a housing 230 having an inlet 232 into a particulate chamber 234. A horizontally disposed transverse wall 236 is positioned in housing 230 to separate particulate chamber 234 from a clean air chamber 238 having a clean air outlet 240. Preliminary particulate separation is accomplished by gravity in particulate chamber 234. Secondary particulate separation is accomplished by at least a pair of vertically oriented modules 242 mounted to transverse wall 236. Housing 230 includes coverplates 244 to provide access to module 242.

Figure 10:
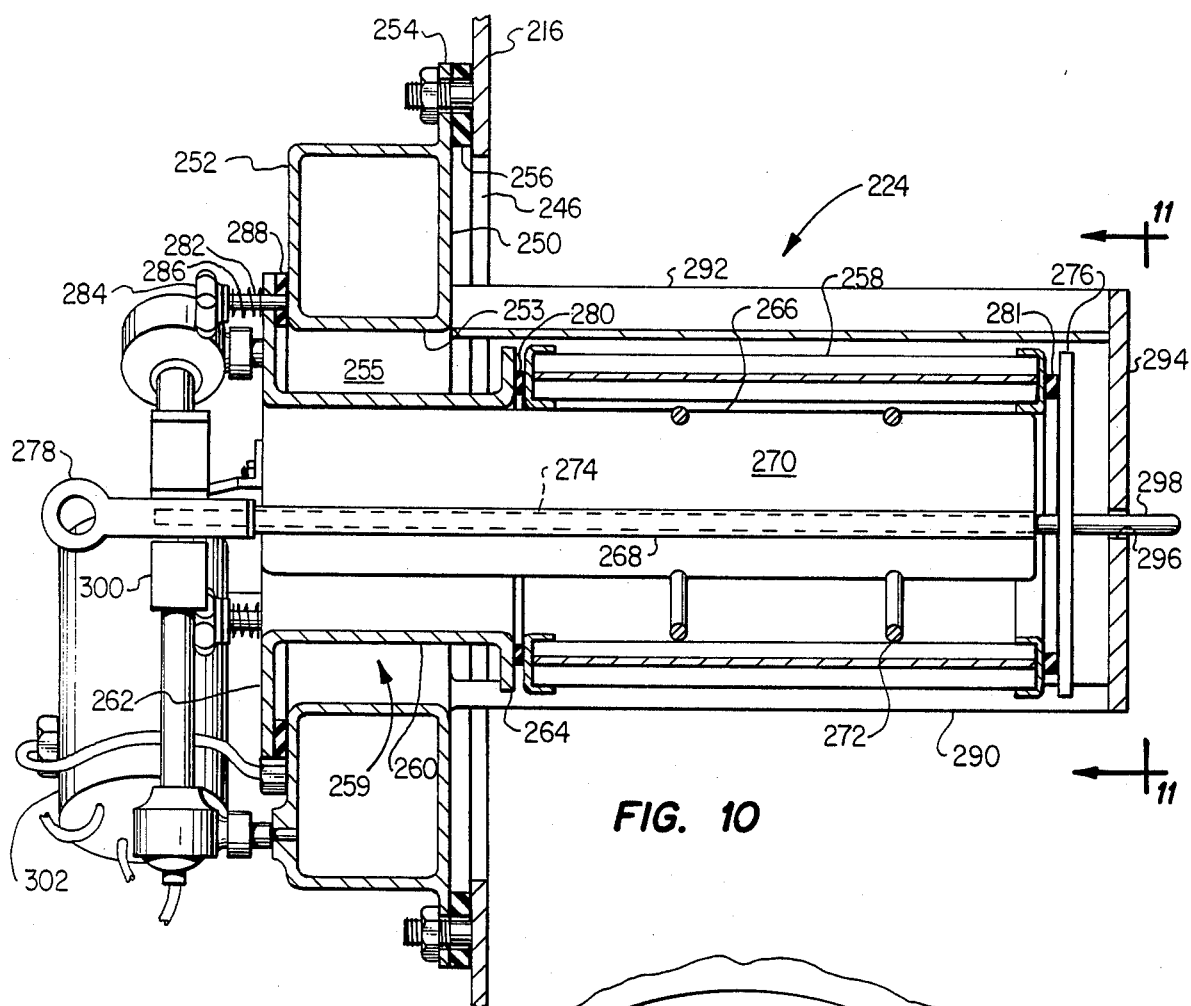
FIG. 10 is a vertical section view of one embodiment of a self-cleaning filter module according to the present invention.
Figure 11:
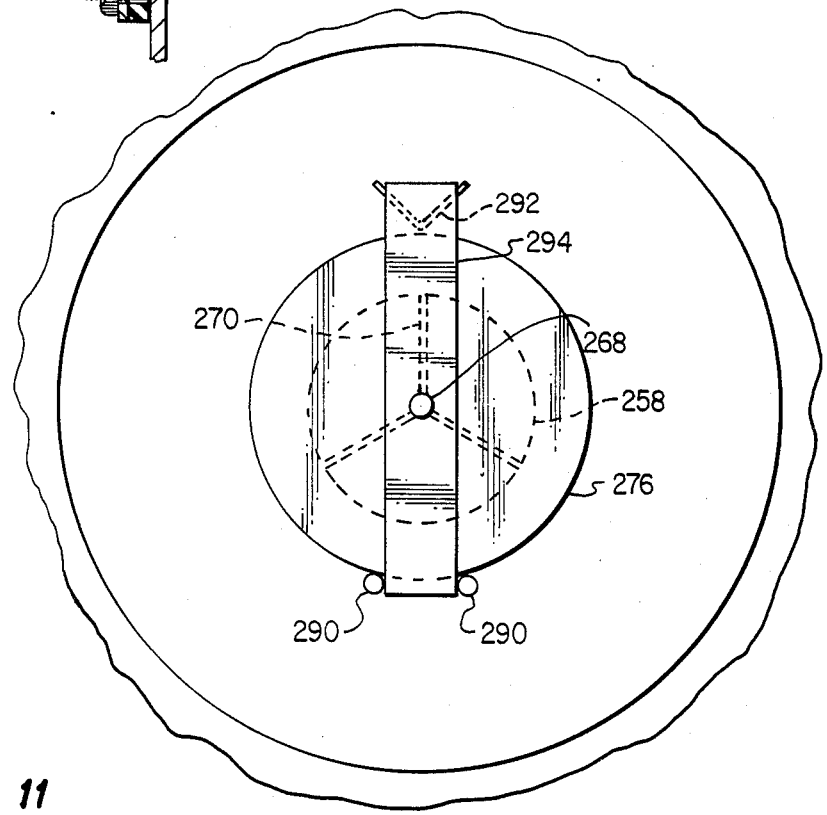
FIG. 11 is an end view of the module taken generally along line 11—11 of FIG. 10; and, FIG. 12 is a vertical section view of another embodiment of a self-cleaning filter module according to the present invention.

Referring now to FIGS. 10 and 11, which show the details of module 224 and its mounting to transverse wall 216 in the system of FIG. 8, transverse wall 216 includes a bore 246. Module 224 includes an annular manifold or pressure fluid reservoir 248 which includes a transverse upstream wall 250 and a spaced apart transverse downstream wall 252. A cylindrical wall 253 interconnects walls 250 and 252 to form a bore 255 through manifold 248. In the preferred embodiment of module 224, upstream wall 250 includes a contiguous radially outwardly extending mounting flange 254, which is mountable to transverse wall 216 by studs or the like. An annular seal ring or gasket 256 is disposed between mounting flange 254 and transverse wall 216.

Module 224 includes an elongated cylindrical pleated paper filter element 258. Filter element 258 is mounted to manifold 248 by a filter support member 259 which includes a cylindrical hub 260 including a first flange 262 and an axially spaced apart second flange 264. A divider member 266 is supported by hub 260 and includes a central draw tube 268 having a plurality of the divider plates 270 extending radially therefrom. A plurality of filter pressure support rings 272 are positioned axially along divider member 266 in order to provide pressure support to filter element 258.

Filter element 258 is mounted to hub 260 by means of a retention rod 274 disposed in draw tube 268. Retention rod 274 carries near one of its ends an end cap 276. The other end of retention rod 274 is threaded for engagement with a rod eye 278. Rod eye 278 bears on the end of draw tube 268 and the threaded cooperation of rod eye 278 with retention rod 274 draws end cap 276 toward the end of filter 258, which in turn is drawn toward second flange 264. Seal rings 280 and 281 are disposed between the ends of filter element 258 and second flange 264 and end cap 276, respectively, to seal the bore of filter element 258 and hub 260.

Filter element 258 and hub 260 are mounted to manifold 248 by means of spaced apart anchor pins connected to manifold 248, which engage clearance holes in first flange 262 in a manner similar to that described with respect to FIGS. 2, 3 and 6, above. Knobs 284 threadedly engage anchor pins 282 to retain springs 286, which bias first flange 262 toward downstream wall 252 of manifold 248. A seal ring 288 is disposed between first flange 262 and downstream wall 252. As described above, if a pressure differential occurs across the axially projected area of first flange 262 produces a force greater than the cumulative biasing force of springs 286, filter element 258 and support member hub 260 will move left-ward, viewing FIG. 10, to allow air to vent past seal ring 288.

Module 224 includes a further support structure which includes a pair of closely spaced apart axially extending filter insertion support rails 290 and a diametrically spaced apart axially extending V-shaped particulate diverter 292. Particulate diverter 292 is positioned closely adjacent the top surface of filter element 258 and overlies vertically upstanding divider plate 270. Particulate diverter 292 thus diverts or deflects laterally material dislodged from filter 258 during backflushing to prevent such material from being redeposited on filter 258.

Support rails 290 and particulate diverter 292 are connected together by a filter safety stop member 294. Filter safety stop member 294 includes a central hole 296 which engages an alignment probe 298 formed by the end of retention rod 274. Support rails 290 and particulate diverter 292 thus form a cage-like structure mounted to upstream wall 250 of manifold 248. Support rails 290 provide a guide when filter element 258 and support member 259 are inserted through the bore 255 of manifold 248 and support rails 290 and the cooperation of alignment probe 298 with hole 296 in filter safety stop 294 provide support to the horizontally mounted filter element 258.

Module 224 includes a reverse flow backflushing system as described above, including nozzle heads 300 movably mounted in the manner described with respect to FIGS. 3, 5 and 7, above. Nozzle heads 300 are thus swingable out of the way so that filter element 258 and support member 260 may be inserted into and removed from the bore of manifold 248. Module 224 also includes a flushing event sequencer, which preferrably is of the type described in U.S. Pat. No. 4,465,497, the disclosure of which is incorporated herein by reference. Module 224 thus provides a complete self-contained self-cleaning filter that may be installed as a unit in existing cabinetry.

Figure 12:
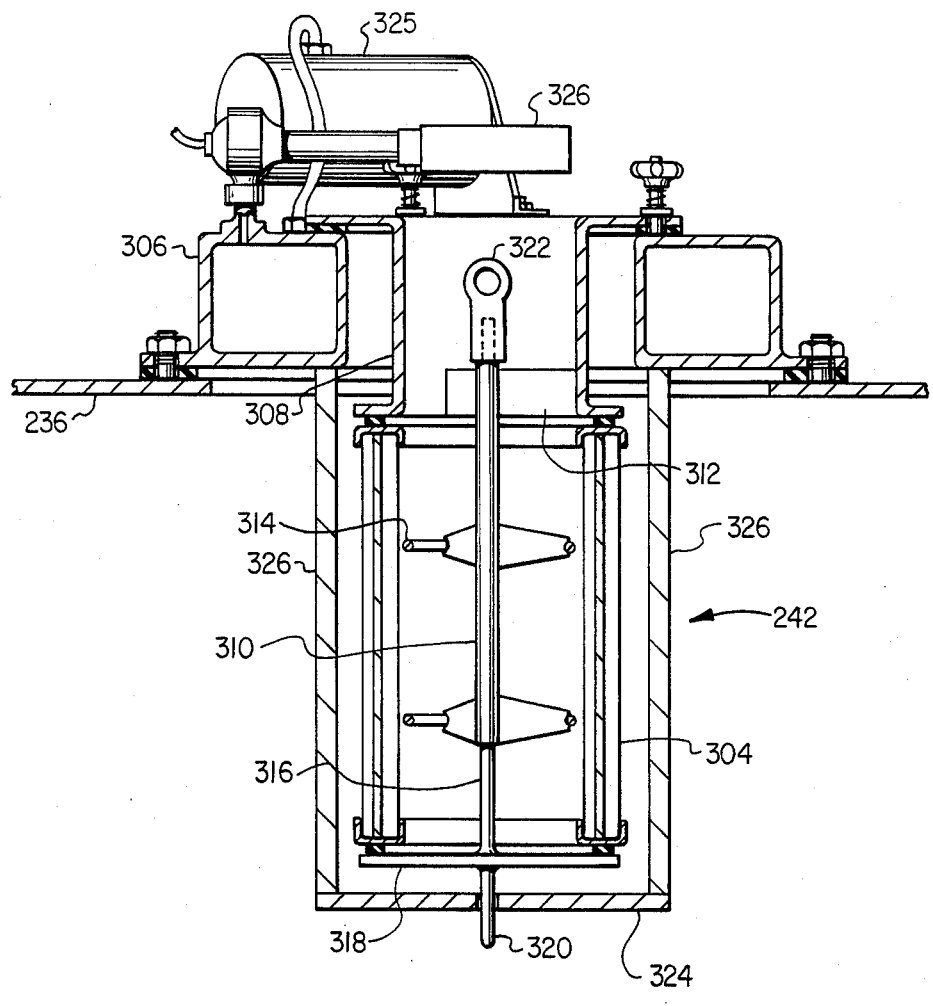

Referring now to FIG. 12, there is shown in detail an alternative module 242 which includes a vertically aligned nonsegmented bore filter element 304. Module 242 is similar to module 224 and includes an annular manifold 306 sealingly mounted to the transverse wall 236 of the housing. A filter support member is mounted to manifold 306 in the manner described above and includes a draw tube 310 mounted to the hub of filter support member 308 by a support web 312. At least two filter pressure support rings 314 are mounted by webs at axially spaced apart locations on draw tube 310 to provide pressure support to filter element 304. A retention rod 316, including and end cap 318 and an alignment probe 320, is carried by draw tube 310 and is retained by threaded rod eye 322. A filter safety stop 324 is supported by diametrically spaced apart mounting bars 326 connected to manifold 306. Filter safety stop 324 engages alignment probe 320 and prevents filter element 242 from falling into the separator cabinet if rod eye 232 becomes unscrewed.

Module 242 includes a single multiple jet backflushing head 326 and flushing sequencer 328, similar to those described above. Module 242 thus provides a self-contained self-cleaning filter system that may be installed as a unit in existing separator cabinetry.

Although a preferred embodiment of the invention has been described herein in detail, those skilled in the art will appreciate that various substitutions and modifications may be made to the invention. For example, it is not necessary that the filter element 52 and its support member 60 be utilized in conjunction with a cyclone type separator to enjoy the advantages of a top loading, easily removed and insertable filter element structure. For example, the conduit 36 may enter the chamber 46 at other than a tangential direction to create the cyclonic flow. Moreover, the housing 12 may be modified to be formed as part of a material discharge bin or receiving tank for pneumatic conveying systems and the like as opposed to being formed as a separate separating and filtering structure.

What is claimed is:

1. Apparatus for separating particulate material from an air flow stream, which comprises:
   a housing;

a backflushing air storage manifold positioned in said housing, said manifold including a transverse downstream wall forming a material separation chamber in said housing, a transverse upstream wall spaced apart from said downstream wall, and a wall connecting said upstream and downstream walls and forming a bore through said manifold into said separation chamber;

inlet conduit means for conducting air laden with particulate material into said separation chamber;

a filter support member supported by said downstream wall of said manifold;

and a barrier type filter element supported by said filter support member in such a way that said filter element is insertable into and removable from said separation chamber through said bore.

2. The apparatus set forth in claim 1 including:
a resilient seal member interposed between said support member and said downstream wall of said manifold and forming a seal between said separation chamber and a clean air chamber formed in said housing.

3. The apparatus set forth in claim 1 including:
a top wall of said housing spaced from said downstream wall and defining a clean air flow chamber in said housing;
and backflushing air head means supported in said housing and in flow receiving communication with said manifold for delivering filter element backflushing air to said filter element.

4. The apparatus set forth in claim 3 wherein:
said backflushing air head means includes a plurality of backflushing heads mounted on said manifold by means operable in such a way that said heads may be disposed in alignment with said bore in a first position and are movable to a second position clear of said bore to provide for insertion and removal of said filter element through said bore.

5. The apparatus set forth in claim 4 wherein:
at least one of said backflushing heads includes a releasable coupling for removing said head from said housing.

6. The apparatus set forth in claim 3 wherein:
said support member includes a first flange adapted to be supported on said downstream wall, and resilient seal means interposed between said downstream wall and said first flange and forming a seal between said separation chamber and said clean air chamber.

7. The apparatus set forth in claim 6 including:
means dividing at least a portion of said filter element into plural chamber segments aligned with said head means for conducting a flow of backflushing air through at least a portion of said filter element to dislodge particulate material accumulated thereon.

8. The apparatus set forth in claim 6, wherein:
said support member includes a second flange formed thereon and spaced from said first flange and means interconnecting said first and second flanges and forming a flow passage therebetween, said second flange being operable to support said filter element at one end of said filter element.

9. The apparatus set forth in claim 6 including:
means for yieldably biasing said first flange toward said downstream wall.

10. The apparatus set forth in claim 9 wherein:
said first flange includes a plurality of clearance holes formed therein spaced apart one from the other, and said means for yieldably biasing said first flange includes a plurality of retaining pins extending through said clearance holes and releasably connected to said downstream wall, said retaining pins each including spring means disposed thereon and operable to bias said first flange toward said downstream wall.

11. The apparatus set forth in claim 10 wherein:
said retaining pins include means for securing said springs on said pins when said pins are disconnected from said downstream wall.

12. The apparatus as claimed in claim 1, including:
backflushing air head means supported by said downstream wall for delivering backflushing air to said filter element.

13. The apparatus as claimed in claim 12, wherein:
said backflushing air head means includes a backflushing head movably mounted to said downstream wall and movable between a first position in alignment with said bore to deliver backflushing air to said filter element and a second position clear of said bore so that said filter element may be inserted into and removed from said separation chamber through said bore.

14. The apparatus as claimed in claim 13, wherein said flushing head includes:
a first conduit conduit connected to said downstream wall;
a second conduit extending generally perpendicular to said first conduit;
means for pivotally interconnecting said first and second conduits;
and a nozzle head connected to said second conduit.

15. Apparatus for separating particulate material from an air flow stream comprising:
a housing forming a material separation chamber;
inlet conduit means in communication with said housing for conducting air laden with particulate material into said separation chamber;
a transverse wall of said housing, defining part of said separation chamber;
means forming a bore opening through said transverse wall into said housing and of sufficient diameter to permit insertion and removal of a barrier type filter element with respect to said separation chamber;
a top wall of said housing spaced from said transverse wall and defining a clean air flow chamber in said housing;
a backflushing air storage manifold formed in said housing between an outer side wall of said housing and said bore, and backflushing air head means supported in said housing and in flow receiving communication with said manifold for delivering filter element backflushing air through said passage;
a barrier type filter element, said filter element defining at least an in part clean air flow passage means for conducting clean air in said apparatus; and
a filter support member for supporting said filter element in said separation chamber, said support member including a portion for supporting said support member and said filter element in said housing in such a way that said support member and said filter element are insertable in and removable from said bore and with respect to said transverse wall, said support member including a first flange adapted to be supported on said transverse wall, resilient seal means interposed between said transverse wall and said first flange and forming a seal between said separtion chamber and said clean air chamber, and means contiguous with said first flange and defining part of said passage, and said first flange including a plurality of clearance holes formed therein spaced apart one from the other, and means for yieldably biasing said first flange toward said transverse wall including a plurality of retaining pins extending through said clearance holes and releasably connected to said transverse wall, said retaining pins each including spring means disposed thereon and operable to bias said first flange toward said transverse wall.

16. Apparatus for separating particulate material from an air flow stream comprising:
  a housing forming a material separation chamber and a clean air chamber;
  inlet conduit means in communication with said housing for conducting air laden with particulate material into said separation chamber;
  a transverse wall of said housing, defining part of said separation chamber and interposed between said material separation chamber and said clean air chamber;
  means forming a bore opening through said transverse wall in said housing and of sufficient diameter to permit insertion and removal of a barrier type filter element with respect to said material separation chamber;
  a barrier type filter element, said filter element defining at least in part clean air flow passage means for conducting clean air in said apparatus;
  filter support means, removably connectable to said transverse wall, for supporting said filter element in said material separation chamber in a manner such that said filter support means and said filter element are insertable in and removable from said bore;
  resilient seal means, interposed between said transverse wall and a portion of said filter support means, for forming a seal between said material separation chamber and said clean air chamber; and
  safety venting attachment means for removably connecting a portion of said filter support means to said transverse wall in a manner maintaining the seal formed by said seal means during periods in which the pressure differential between said material separation chamber and said clean air chamber is below a predetermined level, and permitting pressure-caused movement of said portion of said filter support means relative to said transverse wall, to ventingly communicate said material separation chamber and said clean air chamber across said seal means, during periods when the pressure differential between said material separation chamber and said clean air chamber is at or above said predetermined level.

17. Apparatus for separating particulate material from an air flow stream, which comprises:
  a housing;
  a transverse wall positioned to divide said housing into a clean air chamber and a material separation chamber, said transverse wall having a bore therethrough connecting said clean air chamber with said separation chamber;
  an annular backflushing air manifold positioned in said housing adjacent said transverse wall, said manifold including a wall forming a bore through said manifold in alignment with said bore of said transverse wall;
  and a barrier type filter element supported by said transverse wall in such a way that said filter element is insertable into and removable from said separation chamber through said bores of said transverse wall and manifold.

18. The apparatus as claimed in claim 17, including:
  a filter support member supported by said transverse wall and supporting said filter element, said filter support member being removable with said filter element through said clean air chamber;
  and means for sealing between said filter support member and said transverse wall.

19. The apparatus as claimed in claim 18, including spring means urging said filter support member toward said transverse wall.

20. The apparatus as claimed in claim 17, including backflushing air head means supported in said clean air chamber for discharging backflushing air from said manifold to backflush said filter element, said backflushing air head means being movable between a first position in alignment with said bores of said transverse wall and manifold to discharge backflushing air into said filter element and a second position out of alignment with said bores of said transverse wall and manifold to allow removal of said filter element.

21. The apparatus as claimed in claim 20, wherein said transverse wall forms a wall of said manifold.

22. A self-cleaning filter module for use with a particulate pre-separator including a housing with a transverse wall dividing said housing into a material separation chamber and a clean air chamber, said transverse wall having a bore therethrough connecting said clean air chamber with said material separation chamber, said self-cleaning filter module comprising:
  an annular backflushing air manifold sealingly mountable to said transverse wall of said particulate pre-separator housing to further separate said clean air chamber from said material separation chamber, said manifold including a wall forming a bore through said manifold, said bore through said manifold being aligned with said bore through said transverse wall when said manifold is mounted to said transverse wall;
  and a barrier type filter element supported by said manifold in such a way that said filter element is insertable into and removable from said separation chamber through said bores of said transverse wall and manifold when said manifold is mounted to said transverse wall.

23. The self-cleaning filter module as claimed in claim 22, including:
  a filter support member supported by said manifold and supporting said filter element, said filter support element being removable with said filter element through said clean air chamber;
  and means for sealing between said filter support member and said manifold.

24. The self-cleaning filter module as claimed in claim 22, including:
  backflushing air head means supported by said manifold for delivering filter element backflushing air to said filter element.

25. The self-cleaning filter module as claimed in claim 24, wherein:
said backflushing air head means includes at least one backflushing head mounted on said manifold by means operable in such a way that said head may be disposed in alignment with said bore of said manifold to discharge backflushing air into said bore and movable out of alignment with said bore of said manifold to provide for insertion and removal of said filter element through said bore of said manifold.

26. The self-cleaning filter module as claimed in claim 22, wherein said manifold includes:
a transverse downstream wall;
and a transverse upstream wall spaced apart from downstream wall, with said wall forming said bore of said manifold interconnecting said upstream and downstream walls of said manifold.

27. The self-cleaning filter module as claimed in claim 26, wherein said upstream wall of said manifold is sealingly mountable to said transverse wall of said housing.

28. The self-cleaning filter module as claimed in claim 26, including:
a filter support member supported by said downstream wall of said manifold and supporting said filter element;
and means for sealing between said filter support member and said downstream wall of said manifold.

29. The self-cleaning filter module as claimed in claim 28, wherein said filter support member includes:
a first flange supported on said downstream wall of said manifold and resilient seal means interposed between said downstream wall and said first flange.

30. The self-cleaning filter module as claimed in claim 29, including:
means for yieldably biasing said first flange into engagement with said downstream wall.

31. The self-cleaning filter module as claimed in claim 30, wherein:
said first flange includes a plurality of clearance holes formed therein spaced apart from each other, and said means for yieldably biasing said first flange includes a plurality of retaining pins extending through said clearance holes and releasably connected to said downstream wall.

32. The self-cleaning filter module as claimed in claim 31, wherein:
said yieldably biasing means includes spring means disposed about said retaining pins for urging said first flange toward said downstream wall.

33. The self-cleaning filter module as claimed in claim 22, including:
pressure support means for supporting said filter element.

34. The self-cleaning filter module as claimed in claim 33, wherein said pressure support means includes:
a plurality of axially spaced apart support rings positioned in said filter element.

35. The self-cleaning filter module as claimed in claim 34, including:
divider means supporting said support rings and dividing the interior of said filter element into a plurality of axially extending segments.

36. The self-cleaning filter module as claimed in claim 35, including:
a plurality of backflushing heads mounted to said manifold to discharge backflushing air into said segments.

37. The self-cleaning filter module as claimed in claim 22 including:
cage means connected to said manifold for supporting said filter element.

38. The self-cleaning filter module as claimed in claim 37, wherein said filter module is adapted mounting with said filter element extending horizontally.

39. The self-cleaning filter module as claimed in claim 38, wherein said cage means includes:
a pair of axially extending substantially parallel support rails connected to said manifold and spaced apart from each other a distance less than the diameter of said filter element to engage and support said filter element.

40. The self-cleaning filter module as claimed in claim 38, wherein said cage means includes:
diverter means connected to said manifold and extending axially along said filter element for diverting laterally material dislodged from said filter element.

41. The self-cleaning filter module as claimed in claim 37, wherein said cage means includes:
a filter safety stop supported by said manifold to limit axial travel of said filter element with respect to said manifold.

42. The self-cleaning filter module as claimed in claim 41 including:
a filter support member supported by said manifold, said filter support member including alignment probe means engageable with said filter safety stop for aligning said filter element in said cage means.

43. The self-cleaning filter module as claimed in claim 36, including diverter means disposed exterior of said filter element for preventing material dislodged from said filter element during backflushing from being redeposited on said filter element.

44. The self-cleaning filter module as claimed in claim 22, including:
a filter support member supported by said manifold and supporting said filter, said filter support member including a retention rod having an end cap for engaging an end of said filter element.

45. The self-cleaning filter module as claimed in claim 44, including filter safety stop means supported by said manifold and wherein said retention rod includes an alignment probe engageable with said safety stop means to align said filter element with said bore of said manifold.

46. The apparatus of claim 16 wherein:
said portion of said filter support means comprises an annular flange adapted to overlie said transverse wall,
said seal means comprise an annular seal member underlying said annular flange, and
said safety venting attachment means include a plurality of circumferentially spaced threaded anchor pin members having enlarged stop portions thereon, said anchor pin members extending axially through said flange and permitting its movement along their lengths, a plurality of boss members each anchored to said transverse wall and threadingly receiving an end portion of one of said anchor pin members, a plurality of collar members each carried by one of said anchor pin members for sliding movement along its length and bearing against said transverse wall, and a plurality of compression springs each coaxially circumscribing one of said anchor pin members and bearing at its opposite ends against the stop portion and collar member associated with such anchor pin member to thereby resilient urge its collar into contact with said flange, whereby said compression springs create a resilient compressive force on said annular seal member which may be selectively and evenly adjusted by appropriately loosening or tightening said anchor pin members in their associated boss members, and permit pressure-caused movement of said flange to ventingly communicate said material separation chamber and said clean air chamber across said annular seal member.

* * * * *